United States Patent
Hayashi et al.

(10) Patent No.: US 8,199,179 B2
(45) Date of Patent: *Jun. 12, 2012

(54) IMAGE FORMING APPARATUS AND SCANNING UNIT TO SCAN A TARGET SURFACE USING LIGHT FLUXES

(75) Inventors: Yoshinori Hayashi, Kanagawa (JP); Naoto Watanabe, Kanagawa (JP); Daisuke Ichii, Kanagawa (JP); Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 941 days.

This patent is subject to a terminal disclaimer.

(21) Appl. No.: 11/933,800

(22) Filed: Nov. 1, 2007

(65) Prior Publication Data
US 2008/0123159 A1 May 29, 2008

(30) Foreign Application Priority Data

Nov. 24, 2006 (JP) ................................. 2006-316751

(51) Int. Cl.
*B41J 15/14* (2006.01)
*B41J 27/00* (2006.01)
(52) U.S. Cl. ....................................... 347/241; 347/256
(58) Field of Classification Search .................. 347/238, 347/230, 241–244, 256–261; 359/710, 738–740
See application file for complete search history.

(56) References Cited

U.S. PATENT DOCUMENTS

| 4,956,684 A * | 9/1990 | Urata ............................... 257/98 |
| 5,581,392 A | 12/1996 | Hayashi |
| 5,956,070 A * | 9/1999 | Paoli et al. ..................... 347/241 |
| 6,833,939 B1 * | 12/2004 | Ichikawa .................... 359/204.1 |
| 6,927,412 B2 * | 8/2005 | Takahashi et al. .............. 257/13 |
| 7,006,120 B2 | 2/2006 | Sakai et al. |
| 7,106,483 B2 | 9/2006 | Hayashi et al. |
| 7,164,516 B2 | 1/2007 | Hayashi et al. |
| 7,218,432 B2 | 5/2007 | Ichii et al. |
| 7,253,937 B2 | 8/2007 | Ueda et al. |
| 7,271,823 B2 | 9/2007 | Izumi et al. |
| 7,466,331 B2 * | 12/2008 | Maeda .......................... 347/224 |
| 7,545,547 B2 * | 6/2009 | Hayashi et al. ............ 359/204.1 |
| 2006/0077500 A1 | 4/2006 | Hayashi et al. |

(Continued)

FOREIGN PATENT DOCUMENTS

JP 09-138363 5/1997

(Continued)

OTHER PUBLICATIONS

U.S. Appl. No. 12/186,808, filed Aug. 6, 2008, Watanabe, et al.

(Continued)

*Primary Examiner* — Hai C Pham
(74) *Attorney, Agent, or Firm* — Oblon, Spivak, McClelland, Maier & Neustadt, L.L.P.

(57) ABSTRACT

A scanning unit in an image forming apparatus includes a light source, a coupling lens, an aperture, an image forming lens, and a polygon mirror. The light source includes a plurality of surface-emitting lasers. The coupling lens, the aperture, and the image forming lens are arranged on the optical path of light beams emitted by the light source. The polygon mirror deflects light beams of an image formed by the coupling lens towards a photosensitive drum for scanning. The focal length of the image forming lens in a sub-scanning direction is set to be equal to or smaller than an optical path length between the image forming lens and the aperture.

9 Claims, 13 Drawing Sheets

U.S. PATENT DOCUMENTS

| | | |
|---|---|---|
| 2006/0232659 A1 | 10/2006 | Hayashi et al. |
| 2006/0245009 A1 | 11/2006 | Akiyama et al. |
| 2006/0284968 A1 | 12/2006 | Hayashi et al. |
| 2007/0058255 A1 | 3/2007 | Imai et al. |
| 2007/0081217 A1 | 4/2007 | Hayashi et al. |
| 2007/0211325 A1 | 9/2007 | Ichii |

FOREIGN PATENT DOCUMENTS

| | | | |
|---|---|---|---|
| JP | 09138363 A | * | 5/1997 |
| JP | 09-288244 | | 11/1997 |
| JP | 11-326807 | | 11/1999 |
| JP | 2000-241726 | | 9/2000 |
| JP | 2002-296523 | | 10/2002 |
| JP | 2004-012568 | | 1/2004 |
| JP | 2004-287292 | | 10/2004 |
| JP | 2005-250319 | | 9/2005 |
| JP | 2006-140421 | | 6/2006 |
| JP | 2006-171159 | | 6/2006 |
| JP | 2006-259574 | | 9/2006 |

OTHER PUBLICATIONS

U.S. Appl. No. 12/190,182, filed Aug. 12, 2008, Ichii et al.
Japanese Office Action mailed Jun. 1, 2011 for Application No. 2006-316751 filed Nov. 24, 2006.

* cited by examiner

| IMAGE HEIGHT [mm] | BEAM DIAMETER [μm] | |
| --- | --- | --- |
| | MAIN SCANNING DIRECTION | SUB-SCANNING DIRECTION |
| −161.5 | 52.7 | 43.1 |
| −150.0 | 52.5 | 43.0 |
| −100.0 | 52.9 | 43.0 |
| −50.0 | 52.4 | 42.7 |
| 0.0 | 52.2 | 42.5 |
| 50.0 | 52.5 | 43.0 |
| 100.0 | 53.1 | 43.0 |
| 150.0 | 52.5 | 43.0 |
| 161.5 | 52.7 | 43.2 |

FIG.13

| IMAGE HEIGHT [mm] | BEAM DIAMETER [μm] | |
| --- | --- | --- |
| | MAIN SCANNING DIRECTION | SUB-SCANNING DIRECTION |
| −161.5 | 51.3 | 68.5 |
| −150.0 | 51.3 | 68.5 |
| −100.0 | 51.8 | 68.6 |
| −50.0 | 51.9 | 68.6 |
| 0.0 | 52.0 | 68.5 |
| 50.0 | 51.9 | 68.6 |
| 100.0 | 51.9 | 68.6 |
| 150.0 | 51.3 | 68.7 |
| 161.5 | 51.3 | 68.8 |

SUB-
SCANNING
DIRECTION

MAIN
SCANNING
DIRECTION

VCSEL

MAIN SCANNING
DIRECTION

SUB-
SCANNING
DIRECTION

FIG.18

| WAVELENGTH BAND | 780 nm | | 850 nm (Ref.) |
|---|---|---|---|
| MATERIAL SYSTEM OF SPACER LAYER AND QUANTUM WELL LAYER | AlGaAs/AlGaAs | AlGaInP/GaInPAs | AlGaAs/GaAs |
| SPACER LAYER | $Al_{0.6}Ga_{0.4}As$ (Eg=2.0226 eV) | $(Al_xGa_{1-x})_{0.5}In_{0.5}P$ (Eg(x=0.7)=2.324 eV) | $Al_{0.6}Ga_{0.4}As$ (Eg=2.0226 eV) |
| ACTIVE LAYER — QUANTUM WELL LAYER | $Al_{0.12}Ga_{0.88}As$ (Eg=1.5567 eV) | GaInPAs (COMPREHENSIVELY-STRAINED) (Eg=1.5567 eV) | GaAs (Eg=1.42 eV) |
| ACTIVE LAYER — BARRIER WALL LAYER | $Al_{0.3}Ga_{0.7}As$ (Eg=1.78552 eV) | $Ga_xIn_{1-x}P$ (TENSILE-STRAINED) (Eg(x=0.6)=2.02 eV) | $Al_{0.3}Ga_{0.7}As$ (Eg=1.78552 eV) |
| DIFFERENCE IN Eg BETWEEN SPACER LAYER AND QUANTUM WELL LAYER (ΔEg) | 465.9 meV | 767.3 meV | 602.6 meV |
| DIFFERENCE IN Eg BETWEEN BARRIER WALL LAYER AND QUANTUM WELL LAYER (ΔEg) | 228.8 meV | 463.3 meV | 365.5 meV |

FIG.20

| OPTICAL ELEMENT | LIGHT USE EFFICIENCY | |
| --- | --- | --- |
| | POLARIZATION DIRECTION: MAIN SCANNING DIRECTION | POLARIZATION DIRECTION: SUB-SCANNING DIRECTION |
| POLYGON MIRROR | 0.87 | 0.87 |
| SOUNDPROOF GLASS | 0.99 | 0.97 |
| RETROREFLECTOR (TWO-LAYERED COAT: INCIDENT ANGLE AT SUB-SCANNING CROSS-SECTION = 60°) | 0.98 | 0.78 |
| RETROREFLECTOR (FOUR-LAYERED COAT: INCIDENT ANGLE AT SUB-SCANNING CROSS-SECTION = 60°) | 0.99 | 0.87 |
| DUST-TIGHT GLASS (UNCOATED) | 0.97 | 0.95 |

FIG.21

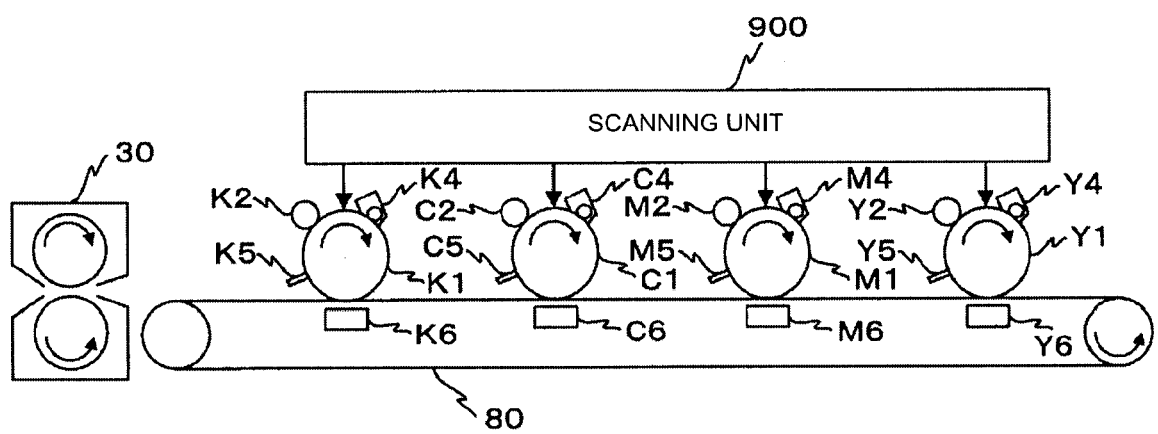

IMAGE FORMING APPARATUS AND SCANNING UNIT TO SCAN A TARGET SURFACE USING LIGHT FLUXES

CROSS-REFERENCE TO RELATED APPLICATIONS

The present application claims priority to and incorporates by reference the entire contents of Japanese priority document, 2006-316751 filed in Japan on Nov. 24, 2006.

BACKGROUND OF THE INVENTION

1. Field of the Invention

The present invention generally relates to an scanning unit and specifically relates to an optical scanning unit.

2. Description of the Related Art

Image forming apparatuses that employ laser are being widely used for printing electronic images. Such an image forming apparatus typically includes a scanning unit and a photosensitive drum. The scanning unit includes a polygon scanner (e.g., a polygon mirror) that deflects laser toward the photosensitive drum, which is rotating, thereby scanning the surface of the photosensitive drum with the laser. Due to such scanning, a latent image is formed on the surface of the photosensitive drum. In image forming apparatuses, image density must be increased to have better image quality, and images must be output speedily to have better operability.

One approach to increase the image density and output speed is to rotate the polygon scanner speedily. However, if the polygon scanner is rotated a high speed, noise and power consumption increases and durability of the polygon scanner drops.

Another approach is to produce multiple beams from a light flux emitted from the light source. As disclosed in Japanese Patent Application Laid-open No. 2005-250319 and Japanese Patent Application Laid-open No. 2004-287292 following three schemes are available for realizing the multiple beams:

(1) combining a plurality of facet emitting lasers,
(2) using a one-dimensional array of the facet emitting lasers, and
(3) a scheme of using a two-dimensional array of vertical cavity surface emitting lasers (VCSELs).

In the scheme (1), a low price can be realized because general-purpose lasers can be used, but using a plurality of beams to stably maintain a relative positional relationship between the lasers and a coupling lens is difficult, and an interval between a plurality of scan lines formed on a scanning target surface (hereinafter, "scan line interval") may possibly become uneven. Further, in the scheme (1), the number of light sources practically has a limit, and the density growth and the increase in speed also have limits. In the scheme (2), an even scan line interval can be formed, but this scheme has a disadvantage that a power consumption of an element is increased. Furthermore, when the number of light sources is extremely increased, a displacement amount of each beam from an optical axis of an optical system is increased, and a so-called beam quality may be degraded.

On the other hand, in the scheme (3), a power consumption is one digit smaller than that of the facet emitting laser, and more light sources can be two-dimensionally integrated.

Japanese Patent Application Laid-Open No. 2005-250319 discloses a light emitting device that includes a plurality of light sources in which a plurality of independent and modulatable light-emitting members are arranged in a two-dimensional array, and a coupling lens that couples the divergent light beams emitted from the light-emitting members. The light emitting device is mounted on an scanning unit that in turn is assembled in an image forming apparatus.

Japanese Patent Application Laid-Open No. 2004-287292 discloses an scanning unit that includes an array of surface-emitting lasers, and an image forming apparatus in which the scanning unit is assembled.

In the conventional scanning units, a beam pitch of the light beams in a sub-scanning direction over the target surface (hereinafter, "sub-scanning beam pitch") deviates from a predetermined beam pitch. As the technology of high-density images forming improves day-by-day, it is necessary to prevent the image quality from deteriorating due to the deviation of the sub-scanning beam pitch.

SUMMARY OF THE INVENTION

It is an object of the present invention to at least partially solve the problems in the conventional technology.

According to an aspect of the present invention, there is provided a scanning unit that scans a scanning target surface by using light fluxes. The scanning unit includes a light source having a plurality of surface-emitting lasers each emitting a light beam; a coupling lens that receives the light beams from the light source and renders the light beams as substantially parallel light; an aperture that receives the parallel light and defines a diameter of the parallel light thereby obtaining a diameter-defined parallel light; an image forming lens that receives the diameter-defined parallel light and forms an image in a sub-scanning direction; and an optical deflector that is arranged close to a focal point of the image forming lens, and that receives light beams of the image and deflects the light beams for scanning a target surface. A focal length of the image forming lens in the sub-scanning direction is equal to or smaller than an optical path length between the image forming lens and the aperture.

According to another aspect of the present invention, there is provided an image forming apparatus including at least one unit of an image carrier; and at least one unit of the above scanning unit for scanning the image carrier.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 13 is a table depicting beam diameters in the main scanning direction and the sub-scanning direction depending on the image height on the photosensitive drum when the conventional aperture plate is used;

FIG. 18 is a table depicting the characteristics of different types of VCSELS;

FIG. 20 is table depicting a relation between polarization direction of an optical element and light use efficiency of that optical element; and FIG. 21 is a schematic diagram of a typical tandem-type color-image forming apparatus.

DETAILED DESCRIPTION OF THE PREFERRED EMBODIMENTS

Exemplary embodiments of the present invention are explained below in detail with reference to the accompanying drawings. The present invention is not limited to these exemplary embodiments.

Figure 1:
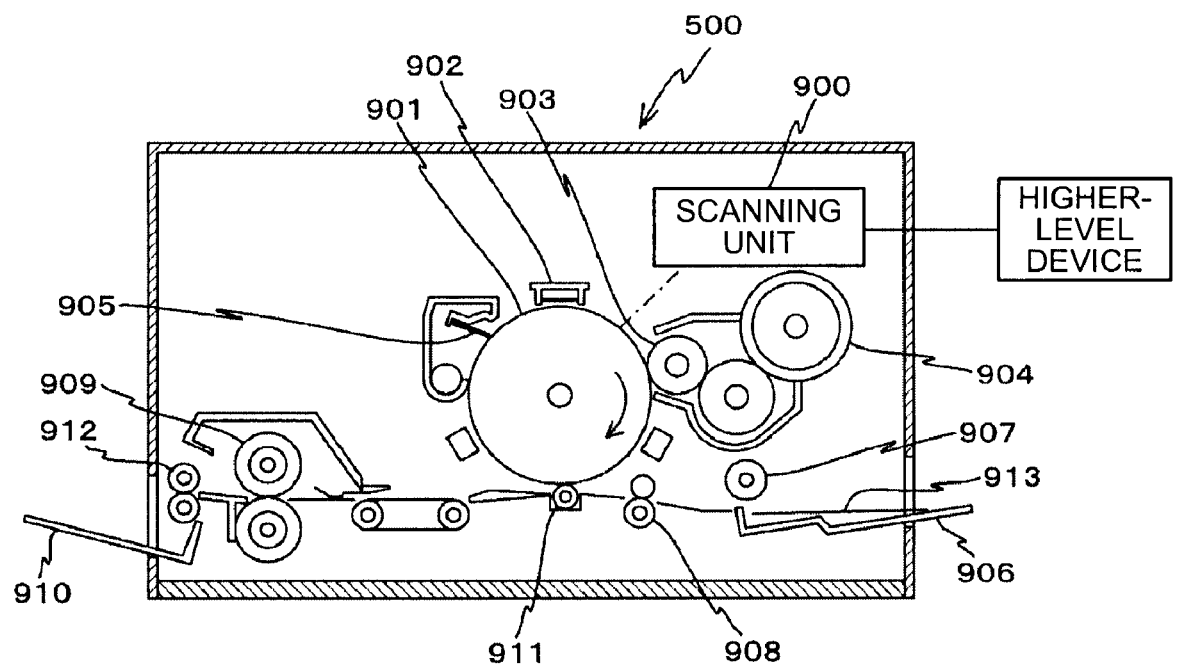
FIG. 1 is a schematic diagram of a laser printer according to a first embodiment of the present invention.

FIG. 1 is a schematic diagram of a laser printer 500 as an image forming apparatus according to a first embodiment of the present invention.

The laser printer 500 includes a scanning unit 900, a photosensitive drum 901, a charger 902, a developing roller 903, a toner cartridge 904, a cleaning blade 905, a sheet-feed tray 906, a sheet-feed roller 907, a pair of registration rollers 908, a fixing roller 909, a sheet-discharge tray 910, a transfer charger 911, and a pair of sheet-discharge rollers 912.

The charger 902, the developing roller 903, the transfer charger 911, and the cleaning blade 905 are arranged around and close to the periphery of the photosensitive drum 901 and in the above-mentioned order along the rotating direction of the photosensitive drum 901 (clockwise direction indicated by an arrow in FIG. 1).

A photosensitive layer is laid on the surface of the photosensitive drum 901. In other words, the surface of the photosensitive drum 901 is a target surface for scanning (hereinafter, "target surface").

The charger 902 uniformly charges the surface, i.e., the photosensitive layer, of the photosensitive drum 901.

Based on image information from a higher-level device (e.g., a personal computer), the scanning unit 900 exposes the charged surface of the photosensitive drum 901 to modulated light. Thus, the electric charge at the portion on the surface of the photosensitive drum 901 exposed to the light becomes neutral. As a result, a latent image corresponding to the image information is formed on the surface of the photosensitive drum 901. The latent image then reaches the developing roller 903. The longitudinal direction (direction along the rotating axis) of the photosensitive drum 901 is referred as a main scanning direction, while the rotating direction of the photosensitive drum 901 is referred as a sub-scanning direction. The scanning unit 900 is described further below.

The toner cartridge 904 contains toner to be supplied to the developing roller 903. The amount of toner in the toner cartridge 904 is checked each time the power supply is turned ON or at the end of a printing process. When the amount of remaining toner is low, a message is displayed on a display unit (not shown) asking a user to replace the toner cartridge 904.

When the developing roller 903 rotates, charged toner is uniformly and thinly applied on the surface of the developing roller 903. A voltage is also applied to the developing roller 903 such that electric fields opposite to each other are generated on the charged portion (portion not exposed to light) and the uncharged portion (portion exposed to light) of the photosensitive drum 901. Subsequently, the toner on the surface of the developing roller 903 is transferred only onto the uncharged portion on the surface of the photosensitive drum 901 such that a toner image is developed. The toner image then reaches the transfer charger 911.

The sheet-feed tray 906 stores therein a plurality of recording sheets 913 as transfer targets. The sheet-feed roller 907 is arranged near the sheet-feed tray 906. The sheet-feed roller 907 draws the recording sheets 913 one by one from the sheet-feed tray 906 and conveys them to the pair of registration rollers 908. The pair of registration rollers 908 is arranged near the transfer charger 911. While the photosensitive drum 901 is rotating, the pair of registration rollers 908 temporarily holds each of the recording sheets 913 drawn by the sheet-feed roller 907 and conveys it to a gap between the photosensitive drum 901 and the transfer charger 911.

A voltage of opposite polarity to that applied to the photosensitive drum 901 is applied to the transfer charger 911 such that the toner on the surface of the photosensitive drum 901 is electrically attracted to the recording sheet 913. Consequently, the toner image on the surface of the photosensitive drum 901 is transferred onto the recording sheet 913. The recording sheet 913 with the toner image on it is then conveyed to the fixing roller 909.

The fixing roller 909 applies heat and pressure to the recording sheet 913, thereby fixing the toner image onto the recording sheet 913. The recording sheet 913 is then conveyed via the sheet-discharge roller 912 to the sheet-discharge tray 910 and is stacked thereon.

The cleaning blade 905 removes the residual toner from the surface of the photosensitive drum 901. The removed residual toner is reused for further processing. The photosensitive drum 901 then returns to the original position to get recharged by the charger 902.

Given below is the description of the scanning unit 900 with reference to FIGS. 2 and 3.

The scanning unit 900 includes a light source 14, a coupling lens 15, an aperture plate 16, an anamorphic lens 17 (hereinafter "image forming lens 17"), a reflecting mirror 18, a polygon mirror 13 as an optical deflector, a polygon motor (not shown) for rotating the polygon mirror 13, a first scanning lens 11a, and a second scanning lens 11b. The vertical direction with respect to FIG. 2 is considered to be the main scanning direction, while the perpendicular direction with respect to FIG. 2 is considered to be the sub-scanning direction.

Figure 3:
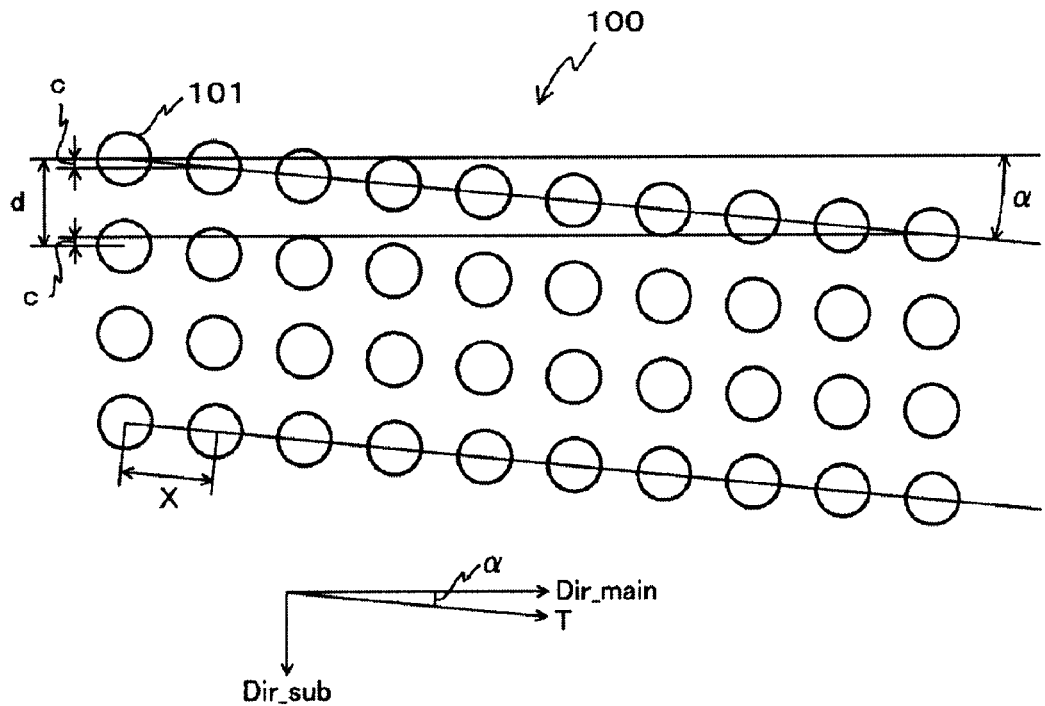
FIG. 3 is a schematic diagram of a two-dimensional array of vertical-cavity surface-emitting lasers (VCSELs) included in a light source shown in FIG. 2.

As an example shown in FIG. 3, the light source 14 includes a two-dimensional array 100 in which 40 light-emitting members 101 are arranged on one substrate. The two-dimensional array 100 includes four rows of the light-emitting members 101, each row including 10 light-emitting members 101 equally spaced along a direction of a tilt angle α (hereinafter, "direction T") between the main scanning direction (hereinafter, "direction Dir_main") and the sub-scanning direction (hereinafter, "direction Dir_sub"). On the other hand, the four rows of the light-emitting members 101 are arranged in the direction Dir_sub and equally spaced from each other. Thus, 40 light-emitting members 101 are two-dimensionally arranged along the direction T and the direction Dir_sub. As shown in FIG. 3, the uppermost row of the light-emitting members 101 is referred as a first row. The row of the light-emitting members 101 adjacent to the first row is referred as a second row. Similarly, the row of the light-emitting members 101 adjacent to and below the second row is referred as a third row. The lowermost row of the light-emitting members 101 is referred as a fourth row.

As an example, the distance between adjacent rows of the light-emitting members 101 in the direction Dir_sub ('d' in FIG. 3) is set to 44.0 micrometers, while the distance between the light-emitting members 101 in each row ('X' in FIG. 3) in the direction T is set to 30.0 micrometers. The distance between the light-emitting members 101 orthographically-projected on a virtual line extending in the direction Dir_sub ('c' in FIG. 3) is set to 4.4 micrometers.

Figure 4:
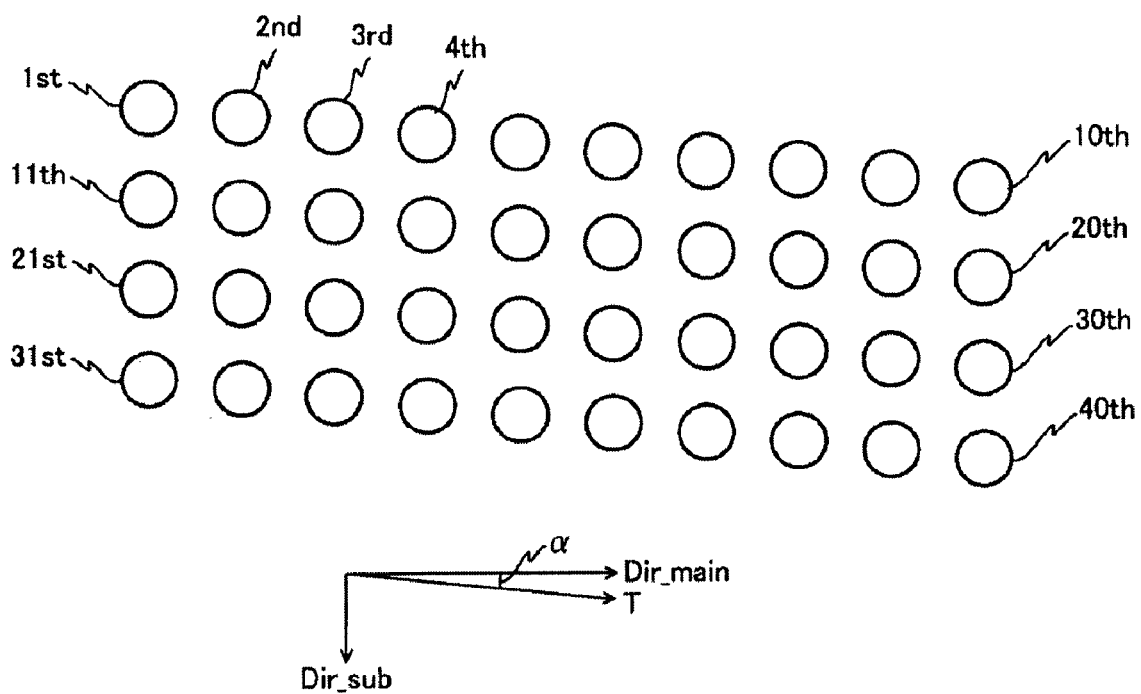
FIG. 4 is a diagram for explaining the numbering of VCSELs in the two-dimensional array shown in FIG. 3.

Each light-emitting member 101 is referred by its position in the two-dimensional array 100 shown in FIG. 4. The leftmost light-emitting member 101 in the first row is referred as a 1st light-emitting member, while the rightmost light-emitting member 101 in the first row is referred as a 10th light-emitting member. The leftmost light-emitting member 101 in the second row is referred as an 11th light-emitting member, while the rightmost light-emitting member 101 in the second row is referred as a 20th light-emitting member. The leftmost light-emitting member 101 in the third row is referred as a 21st light-emitting member, while the rightmost light-emitting member 101 in the third row is referred as a 30th light-emitting member. Similarly, the leftmost light-emitting member 101 in the fourth row is referred as a 31st light-emitting member, while the rightmost light-emitting member 101 in the fourth row is referred as a 40th light-emitting member.

Figure 5:
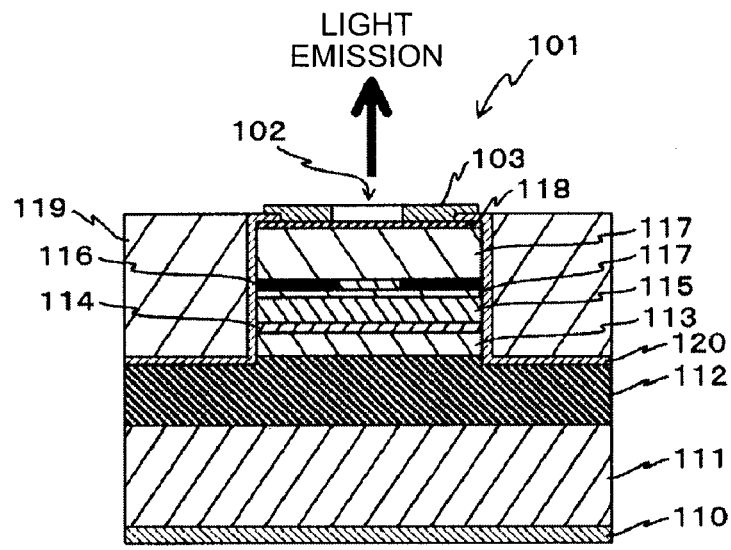
FIG. 5 is a cross-sectional view of a VCSEL in the two-dimensional array shown in FIG. 3.
Figure 6:
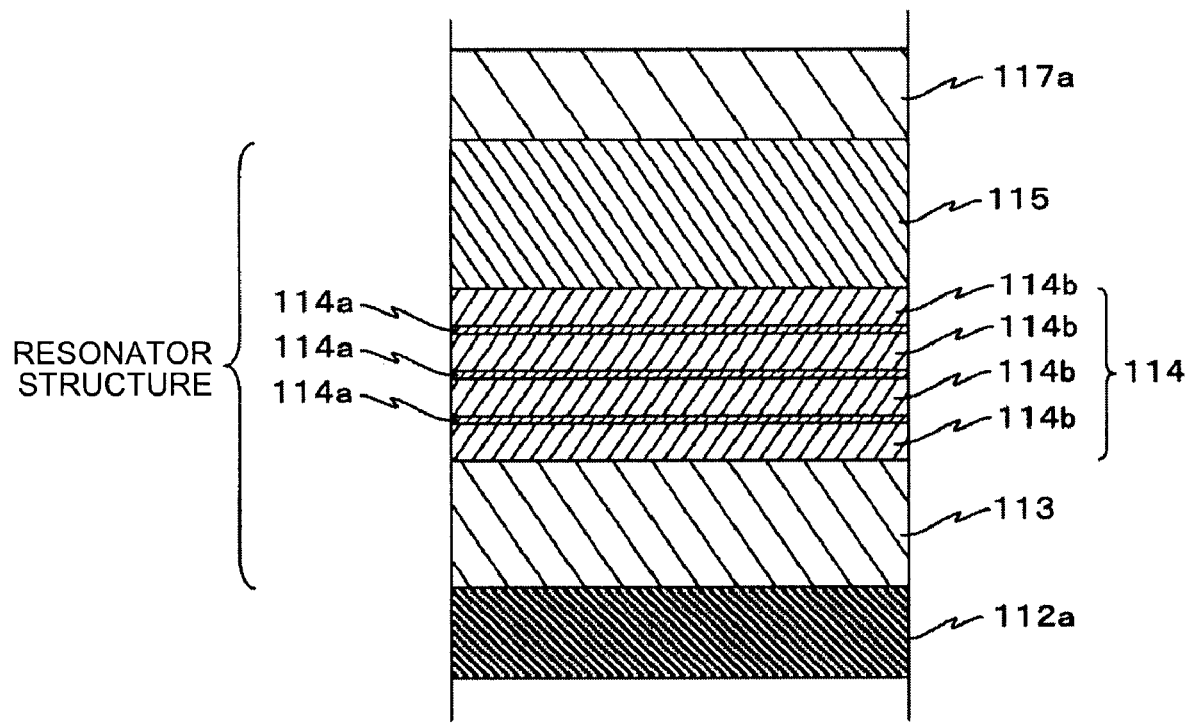
FIG. 6 is an enlarged view of a portion of the VCSEL shown in FIG. 5.

Each light-emitting member 101 is a vertical-cavity surface-emitting laser (VCSEL) of a 780-nanometer band. As an example shown in FIG. 5, a plurality of semiconductor layers, i.e., a lower reflecting mirror 112, a first spacer layer 113, an active layer 114, a second spacer layer 115, an upper reflecting mirror 117, and a p-contact layer 118 are stacked on an n-GaAs substrate 111. Such a structure of semiconductor layers stacked together is referred as a multilayered structure. FIG. 6 is an enlarged view of a portion of the multilayered structure around the active layer 114.

The lower reflecting mirror 112 includes 40.5 pairs of a low-refractive-index layer 112a made of n-$Al_{0.9}Ga_{0.1}As$ and a high-refractive-index layer 112b made of n-$Al_{0.3}Ga_{0.7}As$. Both the low-refractive-index layer 112a and the high-refractive-index layer 112b have an optical thickness of $\lambda/4$ where $\lambda$ is an oscillation wavelength. A composition-transformation layer (not shown) used to facilitate gradual transformation of material composition between two layers is laid between the low-refractive-index layer 112a and the high-refractive-index layer 112b such that electric resistance between the low-refractive-index layer 112a and the high-refractive-index layer 112b is reduced.

The first spacer layer 113 is made of $Al_{0.9}Ga_{0.4}As$.

As shown in FIG. 6, the active layer 114 includes a quantum well layer 114a made of $Al_{0.12}Ga_{0.88}As$ and a barrier wall layer 114b made of $Al_{0.3}Ga_{0.7}As$.

The second spacer layer 115 is made of $Al_{0.9}Ga_{0.4}As$.

The first spacer layer 113, the active layer 114, and the second spacer layer 115 together are referred as a resonator structure that has an optical thickness equal to one oscillation wavelength (oscillation wavelength $\lambda$=780 nanometers) (refer to FIG. 6).

The upper reflecting mirror 117 includes 24 pairs of a low-refractive-index layer 117a made of p-$Al_{0.9}Ga_{0.1}As$ and a high-refractive-index layer 117b made of p-$Al_{0.3}Ga_{0.7}As$. Both the low-refractive-index layer 117a and the high-refractive-index layer 117b have an optical thickness of $\lambda/4$. A composition-transformation layer (not shown) is laid between the low-refractive-index layer 117a and the high-refractive-index layer 117b to reduce electric resistance.

A selected oxide layer 116 made of AlAs is laid at a distance $\lambda/4$ from the resonator structure in the upper reflecting mirror 117.

Given below is a brief description of a method of manufacturing the two-dimensional array 100:

(1) The multilayered structure is manufactured by a crystal growth mechanism such as a metal organic chemical vapor deposition (MOCVD) method or a molecular beam epitaxy (MBE) method.

(2) A salient is formed on the periphery of each light-emitting member 101 by using the dry etching method such that the salient resembles a mesa (mesa portion). In FIG. 5, the bottom surface of the salient is shown to be penetrating into the lower reflecting mirror 112. However, it is not necessary that the bottom surface penetrates into the lower reflecting mirror 112 as long as it is deeper than the selected oxide layer 116. Consequently, the selected oxide layer 116 appears on a side wall of the salient. It is recommended to maintain the diameter of the mesa portion equal to or more than 10 micrometers. If the diameter is too small, heat accumulates at the time of emitting light, which may adversely affect the light-emitting characteristics. Moreover, it is recommended to maintain the width of salient equal to or more than five micrometers. If the salient width is too small, it becomes difficult to control the etching process.

(3) The multilayered structure with the salient formed thereon is subjected to a vapor heat treatment, and the periphery of the selected oxide layer 116 in the mesa portion is selectively oxidized to form an insulator layer of $Al_xO_y$. Because of selective oxidization, some non-oxidized AlAs area of the selected oxide layer 116 remains at the central part of the mesa portion. Consequently, the path for a driving current of the corresponding light-emitting member 101 is restricted only to the central part of the mesa portion thereby forming an electric-current narrowing structure.

(4) A $SiO_2$ protective layer 120 having a thickness of, e.g., 150 nanometers is laid on the mesa portion, except on an area where an upper electrode 103 and a light emitter 102 are arranged. Furthermore, a polyimide 119 is filled around the salient to flatten the multilayered structure of each light-emitting member 101.

(5) The upper electrode 103 is arranged on the p-contact layer 118 except on the area where the light emitter 102 is arranged. A bonding pad (not shown) is also strapped around the multilayered structure. The upper electrode 103 is connected to the bonding pad by wires (not shown).

(6) A lower electrode (n-side common electrode) 110 is arranged on the rear surface of the multilayered structure.

(7) The multilayered structure is cut into a plurality of chips.

Given below is the description of positional relation between the components of the scanning unit 900 with reference to FIG. 7.

The coupling lens 15 is arranged on the optical path of the light beams emitted by the light source 14 and at an optical path length of, e.g., 39.305 millimeters ('d1' in FIG. 7) from the light source 14. The thickness of the coupling lens 15 is, e.g., 3.8 millimeters ('d2' in FIG. 7). The focal length of the coupling lens 15 is, e.g., 42.0 millimeters. The coupling lens renders the light beams as substantially parallel light.

Both surfaces of the coupling lens 15 have a non-arc shape expressed by Equation (1) given below. In Equation (1), 'x' represents depth in the axial direction, 'h' represents distance from the optical axis, 'R' represents paraxial curvature radius, 'K' represents conic constant, and 'A$_4$', 'A$_6$', 'A$_8$', 'A$_{10}$', etc. represent coefficients.

$$x = \frac{\frac{h^2}{R}}{1 + \sqrt{1 - (1+k) \cdot \left(\frac{h}{R}\right)^2}} + A_4 \cdot h^4 + A_6 \cdot h^6 + A_8 \cdot h^8 + A_{10} \cdot h^{10} \quad (1)$$

For example, the surface of the coupling lens 15 facing the light source 14 (first surface) has R=∞, while the other surface of the coupling lens 15 (second surface) has R=−21.519 millimeters. The values of 'R', 'K', and 'A$_4$', 'A$_6$', 'A$_8$', 'A$_{10}$', etc. are set such that wavefront aberration is corrected.

The light source 14 and the coupling lens 15 are supported by a supporting material made of aluminum (Al). A cover glass (not shown) having refractive index of 1.5112 and thickness of 0.3 millimeters is arranged between the light source 14 and the coupling lens 15.

The aperture plate 16 is arranged between the coupling lens 15 and the image forming lens 17 on the optical path of the parallel light output by the coupling lens 15, and at an optical path length of, e.g., 13.8 millimeters from the second surface of the coupling lens 15. That is, the aperture plate 16 is arranged between the coupling lens 15 and the back focal position of the coupling lens 15. The aperture plate 16 defines the diameter of the parallel light.

Figure 8:
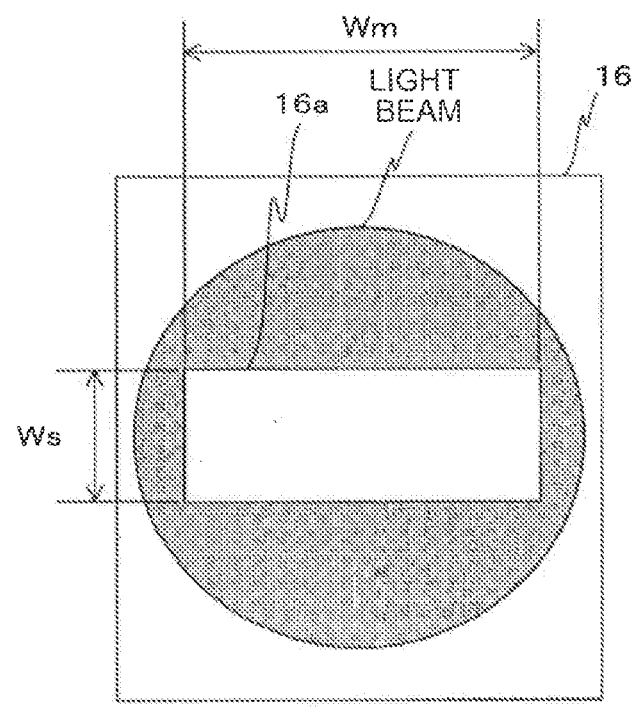
FIG. 8 is an enlarged front view of an aperture plate shown in FIG. 2.

As shown in FIG. 8, an aperture 16a of the aperture plate 16 has a width (Wm) of, e.g., 5.6 millimeters in the direction Dir_main and a width (Ws) of, e.g., 1.3 millimeters in the direction Dir_sub.

The image forming lens 17 is arranged between the aperture plate 16 and the reflecting mirror 18 on the optical path of the parallel light, whose diameter is defined by the size of the aperture 16a, and at the optical path length of, e.g., 79.3 millimeters ('d3' in FIG. 7) from the second surface of the coupling lens 15. The thickness of the image forming lens 17 is, e.g., 3.0 millimeters ('d4' in FIG. 7). The image forming lens 17 forms an image from the parallel light, which is reflected by the reflecting mirror 18 towards the polygon mirror 13, in the direction Dir_sub and near a deflecting surface of the polygon mirror 13.

The surface of the image forming lens 17 facing the aperture plate 16 (first surface) is a cylindrical surface and is a power lens in the direction Dir_sub. The radius of curvature of the cylindrical surface in the direction Dir_sub is, e.g., 26.9 millimeters. The other surface of the image forming lens 17 (second surface) is a flat surface.

The focal length of the image forming lens 17 in the direction Dir_sub is, e.g., 53 millimeters, which is smaller than the optical path length between the image forming lens 17 and the aperture plate 16 (e.g., 65.5 millimeters).

Figure 2:
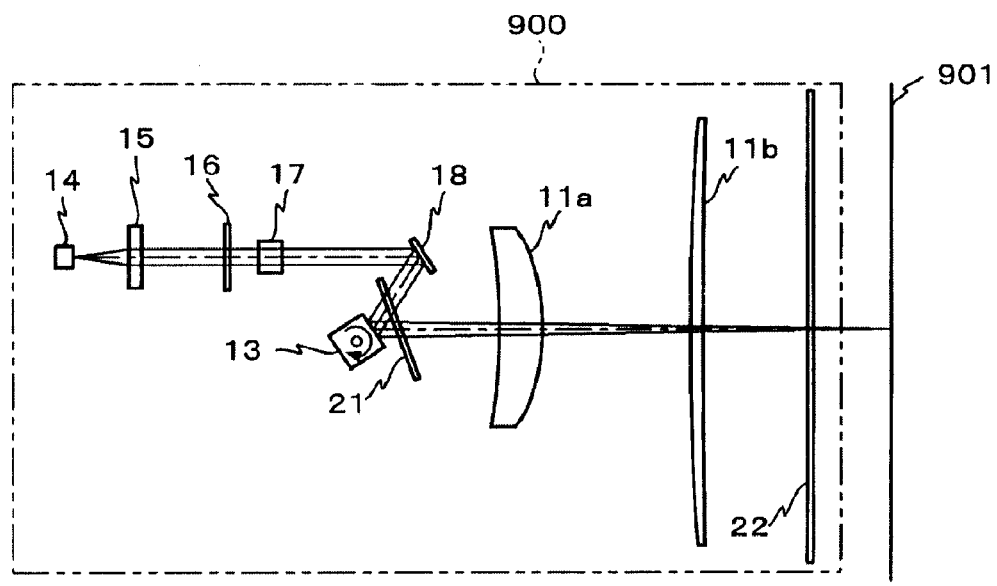
FIG. 2 is a detailed schematic diagram of a scanning unit shown in FIG. 1.

A soundproof glass (not shown) is arranged between the image forming lens 17 and the polygon mirror 13, while a soundproof glass 21 is arranged between the polygon mirror 13 and the first scanning lens 11a (refer to FIG. 2).

The optical system arranged on the optical path between the light source 14 and the polygon mirror 13 is referred as a coupling optical system that includes the coupling lens 15, the aperture plate 16, the image forming lens 17, and the reflecting mirror 18.

The polygon mirror 13 is, e.g., a four-surface mirror having an inscribed circle of radius equal to 7 millimeters. Each surface functions as a deflecting surface. The polygon mirror 13 rotates with a constant speed around a rotating axis parallel to the direction Dir_sub. The polygon mirror 13 is arranged at a position where the optical path length between its rotating axis and the second surface of the image forming lens 17 is, e.g., 51.8 millimeters.

The first scanning lens 11a is arranged on the optical path of the light beams deflected by the polygon mirror 13. The first scanning lens 11a is arranged at a position where the optical path length between the rotating axis of the polygon mirror 13 and the surface of the first scanning lens 11a facing the polygon mirror 13 (incident surface) is, e.g., 46.3 millimeters ('d6' in FIG. 7).

As an example shown in Table 1 given below, the first scanning lens 11a includes the incident surface having a paraxial curvature radius of −120 millimeters in the direction Dir_main and a paraxial curvature radius of −500 millimeters in the direction Dir_sub, and an output surface having a paraxial curvature radius of −59.28 millimeters in the direction Dir_main and a paraxial curvature radius of −600 millimeters in the direction Dir_sub. The thickness of the first scanning lens 11a along the optical axis is, e.g., 13.5 millimeters ('d7' in FIG. 7).

TABLE 1

|  | Incident surface | Output surface |
| --- | --- | --- |
| Paraxial curvature radius in direction Dir_main | −120 | −59.28 |
| Paraxial curvature radius in direction Dir_sub | −500 | −600 |

Figure 7:
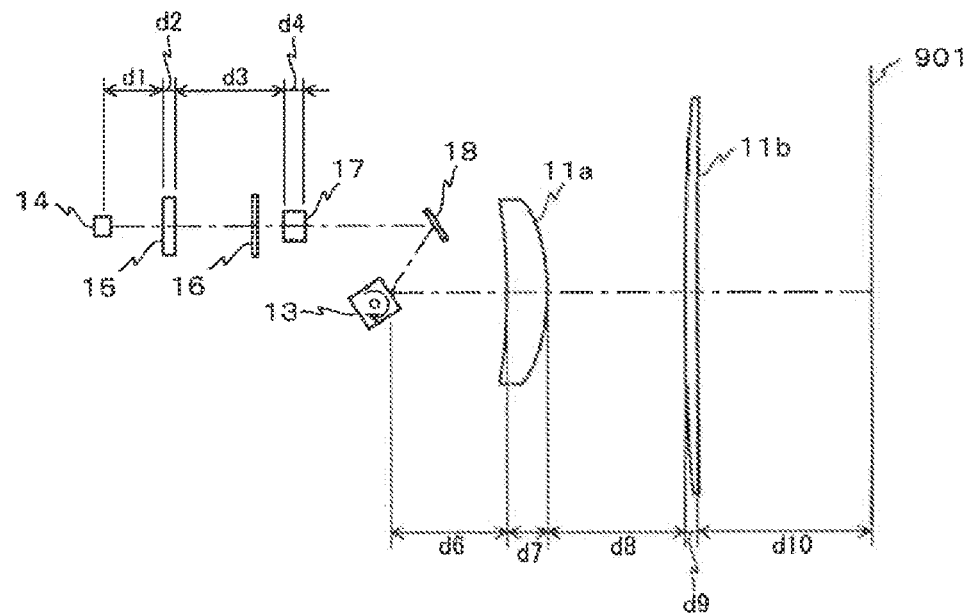
FIG. 7 is a diagram for explaining the positional relation between components of the scanning unit shown in FIG. 2.

The second scanning lens 11b is arranged on the optical path of the light beams output from the output surface of the first scanning lens 11a, and at a position where the optical path length between the output surface of the first scanning lens 11a and the surface of the second scanning lens 11b facing the first scanning lens 11a (incident surface) is, e.g., 89.7 millimeters ('d8' in FIG. 7). As an example shown in Table 2 given below, the second scanning lens 11b includes the incident surface having a paraxial curvature radius of ∞ in the direction Dir_main and a paraxial curvature radius of 522 millimeters in the direction Dir_sub, and an output surface having a paraxial curvature radius of 540.6 millimeters in the direction Dir_main and a paraxial curvature radius of −40.75 millimeters in the direction Dir_sub. The thickness of the second scanning lens 11b along the optical axis is, e.g., 3.5 millimeters ('d9' in FIG. 7).

TABLE 2

|  | Incident surface | Output surface |
|---|---|---|
| Paraxial curvature radius in direction Dir_main | ∞ | 540.6 |
| Paraxial curvature radius in direction Dir_sub | 522 | −40.75 |

Each surface in the first scanning lens 11a and the second scanning lens 11b is an aspherical surface having a non-arc shape defined by abovementioned Equation (1). The curvature of each surface, which is a specifically-shaped surface as mentioned above, in a virtual cross-section parallel to the direction of the optical axis and the direction Dir_sub (hereinafter, "sub-scanning cross-section") changes towards the direction Dir_main according to Equation (2) given below. In Equation (2), 'Y' represents the distance from the optical axis towards the direction Dir_main, '$R_s$' represents the paraxial curvature radius in the direction Dir_sub, and '$B_1$', '$B_2$', '$B_3$', etc. represent coefficients.

$$Cs(Y) = \frac{1}{R_S} + B_1 \cdot Y + B_2 \cdot Y^2 + B_3 \cdot Y^3 + B_4 \cdot Y^4 + B_5 \cdot Y^5 + B_6 \cdot Y^6 \quad (2)$$

The values of the conic constant and each coefficient of the incident surface of the first scanning lens 11a are given below in Table 3.

TABLE 3

| K | 0 | $B_1$ | 0 |
|---|---|---|---|
| $A_4$ | $8.885 \times 10^{-7}$ | $B_2$ | 0 |
| $A_6$ | $-2.629 \times 10^{-10}$ | $B_3$ | 0 |
| $A_8$ | $2.1846 \times 10^{-14}$ | $B_4$ | 0 |
| $A_{10}$ | $1.368 \times 10^{-17}$ | $B_5$ | 0 |
| $A_{12}$ | $-3.135 \times 10^{-21}$ | $B_6$ | 0 |
|  |  | $B_7$ | 0 |
|  |  | $B_8$ | 0 |

The values of the conic constant and each coefficient of the output surface of the first scanning lens 11a are given below in Table 4.

TABLE 4

| K | 0 | $B_1$ | $-1.594 \times 10^{-6}$ |
|---|---|---|---|
| $A_4$ | $9.2240 \times 10^{-7}$ | $B_2$ | $-4.332 \times 10^{-6}$ |
| $A_6$ | $6.7782 \times 10^{-11}$ | $B_3$ | $4.9819 \times 10^{-9}$ |
| $A_8$ | $-4.1124 \times 10^{-14}$ | $B_4$ | $-2.8594 \times 10^{-9}$ |
| $A_{10}$ | $1.3727 \times 10^{-17}$ | $B_5$ | $-2.677 \times 10^{-12}$ |
| $A_{12}$ | $2.069 \times 10^{-21}$ | $B_6$ | $2.8778 \times 10^{-13}$ |
|  |  | $B_7$ | $-1.916 \times 10^{-15}$ |
|  |  | $B_8$ | $2.0423 \times 10^{-15}$ |
|  |  | $B_9$ | $1.0141 \times 10^{-18}$ |
|  |  | $B_{10}$ | $-6.729 \times 10^{-19}$ |

The values of the conic constant and each coefficient of the incident surface of the second scanning lens 11b are given below in Table 5.

TABLE 5

| K | 0 | $B_1$ | 0 |
|---|---|---|---|
| $A_4$ | $3.286 \times 10^{-7}$ | $B_2$ | $-1.1328 \times 10^{-6}$ |
| $A_6$ | $-7.085 \times 10^{-11}$ | $B_3$ | $2.60612 \times 10^{-10}$ |
| $A_8$ | $6.269 \times 10^{-15}$ | $B_4$ | $7.8961 \times 10^{-11}$ |
| $A_{10}$ | $-2.7316 \times 10^{-19}$ | $B_5$ | $-5.027 \times 10^{-14}$ |
| $A_{12}$ | $4.739 \times 10^{-24}$ | $B_6$ | $1.4051 \times 10^{-14}$ |
|  |  | $B_7$ | $4.5538 \times 10^{-18}$ |
|  |  | $B_8$ | $-2.0140 \times 10^{-18}$ |
|  |  | $B_9$ | $-1.546 \times 10^{-22}$ |
|  |  | $B_{10}$ | $7.4893 \times 10^{-23}$ |

The values of the conic constant and each coefficient of the output surface of the second scanning lens 11b are given below in Table 6.

TABLE 6

| K | 0 | $B_1$ | 0 |
|---|---|---|---|
| $A_4$ | $1.2779 \times 10^{-7}$ | $B_2$ | $2.311 \times 10^{-7}$ |
| $A_6$ | $-4.629 \times 10^{-11}$ | $B_3$ | 0 |
| $A_8$ | $4.049 \times 10^{-15}$ | $B_4$ | 0 |
| $A_{10}$ | $-1.659 \times 10^{-19}$ | $B_5$ | 0 |
| $A_{12}$ | $2.585 \times 10^{-24}$ | $B_6$ | 0 |
|  |  | $B_7$ | 0 |
|  |  | $B_8$ | 0 |

The optical system arranged on the optical path between the polygon mirror 13 and the photosensitive drum 901 is referred as a scanning optical system that includes the first scanning lens 11a and the second scanning lens 11b.

The photosensitive drum 901 is arranged at a position where the optical path length between the output surface of the second scanning lens 11b and the photosensitive drum 901 is, e.g., 142.5 millimeters ('d10' in FIG. 7). A dust-tight glass 22 having refractive index of 1.5112 and thickness of 1.9 millimeters is arranged between the second scanning lens 11b and the photosensitive drum 901 (refer to FIG. 2).

The length of the portion on the surface of the photosensitive drum 901 on which scanning is possible, that is, the width in which image writing in the direction Dir_main is possible, is, e.g., 323 millimeters.

In the coupling optical system and the scanning optical system, the lateral magnification in the direction Dir_main is 5.7 times, while the lateral magnification in the direction Dir_sub is 1.2 times. That is, the absolute value of the lateral magnification in the direction Dir_main is more than the absolute value of the lateral magnification in the direction Dir_sub. As a result, the scanning-line distance narrows thereby improving the image resolution. The scanning-line distance in the scanning unit 900 is, e.g., 5.3 micrometers. Consequently, a resolution of, e.g., 4800 dots per inch (dpi) can be achieved.

Meanwhile, even if a large number of light-emitting members are arranged in a two-dimensional array, the sub-scanning beam pitch may still deviate from a predetermined beam pitch depending on the positional errors or the shape errors of the light-emitting members. It is necessary to maintain a stable sub-scanning beam pitch to prevent deterioration in the image quality.

To obtain a stable sub-scanning beam pitch, the distance between adjacent light beams, which are incident on a scanning lens having its power lens in the sub-scanning direction, is narrowed such that the incident angle of the light beams with respect to a target surface becomes smaller. As a result, irrespective of positional errors or shape errors in the light-emitting members, the deviation of the sub-scanning beam pitch can be reduced.

Figure 9:
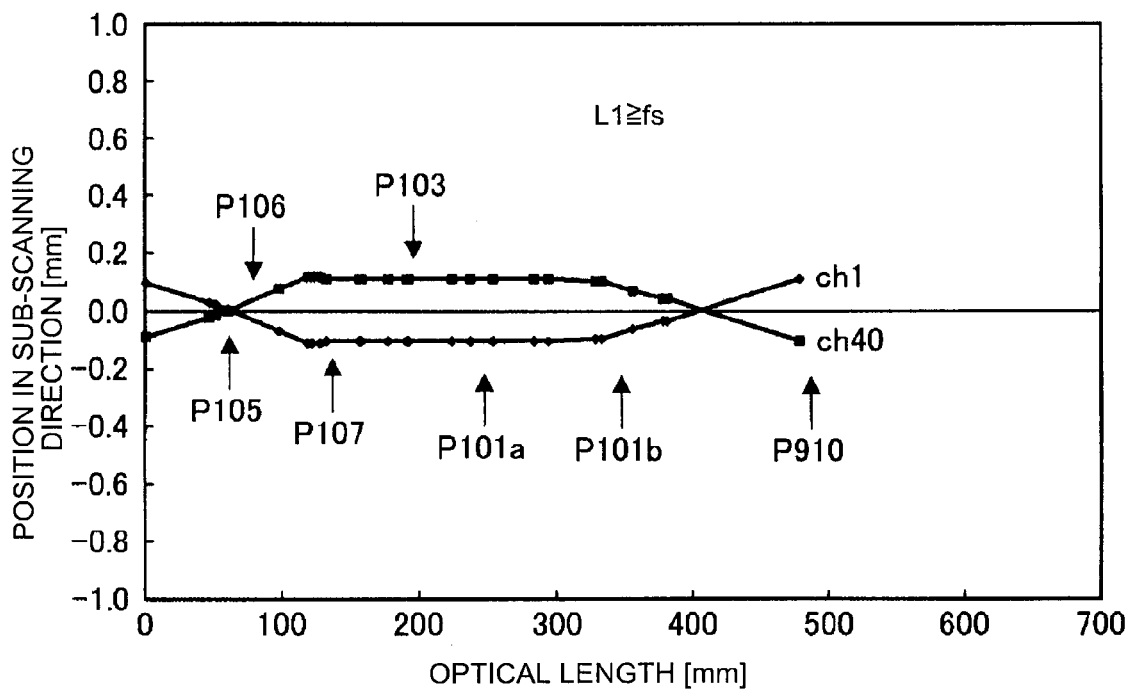
FIG. 9 is a graph of an optical path of a light beam emitted by a 1st light-emitting member and an optical path of a light beam emitted by a 40th light-emitting member for an image forming lens, shown in FIG. 2, having a focal length in a sub-scanning direction equal to or smaller than the optical path length between the image forming lens and the aperture plate.

FIG. 9 is a graph of an optical path of a light beam (ch1) emitted by the 1st light-emitting member and an optical path of a light beam (ch40) emitted by the 40th light-emitting member. In FIG. 9, 'P105' indicates the position of the coupling lens 15, 'P106' indicates the position of the aperture plate 16, 'P107' indicates the position of the image forming lens 17, 'P103' indicates the position of the polygon mirror 13, 'P101a' indicates the position of the first scanning lens 11a, 'P101b' indicates the position of the second scanning lens 11b, and 'P910' indicates the position of the photosensitive drum 901.

In FIG. 9, the focal length of the image forming lens 17 in the direction Dir_sub (fs) is set to be equal to or smaller than the optical path length between the image forming lens 17 and the aperture plate 16 (L1). As a result, mutual widening of adjacent light beams output from the image forming lens 17 in the direction Dir_sub can be prevented, i.e., a stable sub-scanning beam pitch can be obtained. Subsequently, the incident angle of the light beams with respect to the photosensitive drum 901 becomes smaller. Thus, irrespective of positional errors or shape errors in the light-emitting members 101, the deviation of the sub-scanning beam pitch can be reduced. Moreover, because the light beams in the direction Dir_sub pass thorough the proximity of the optical axis of the first scanning lens 11a and the second scanning lens 11b, the overall optical characteristics of the scanning unit 900 also improve.

Figure 10:
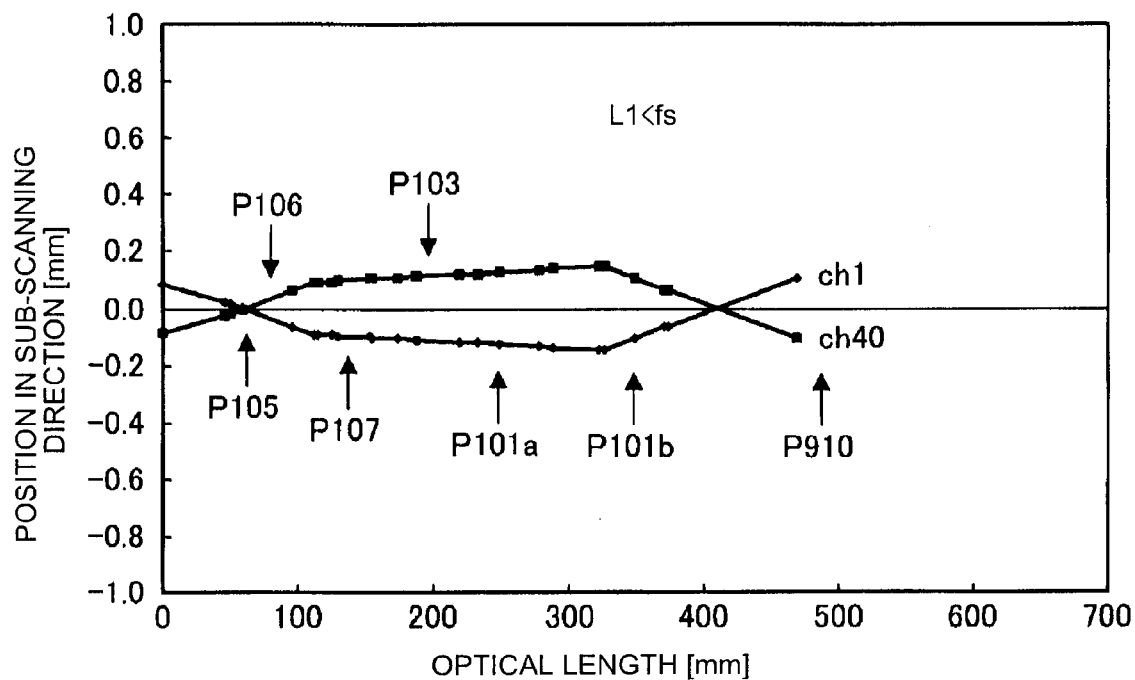
FIG. 10 is a graph of an optical path of a light beam emitted by the 1st light-emitting member and an optical path of a light beam emitted by the 40th light-emitting member for the image forming lens having a focal length in a sub-scanning direction greater than the optical path length between the image forming lens and the aperture plate.

As compared to the graph shown in FIG. 9, FIG. 10 is a graph of ch1 and ch40 when fs is set to be greater than L1. As shown in FIG. 10, the light beams ch1 and ch40 gradually widen with respect to the direction Dir_sub. As a result, the deviation of the sub-scanning beam pitch varies depending on positional errors or shape errors in the light-emitting members 101.

Figures 11, 12:
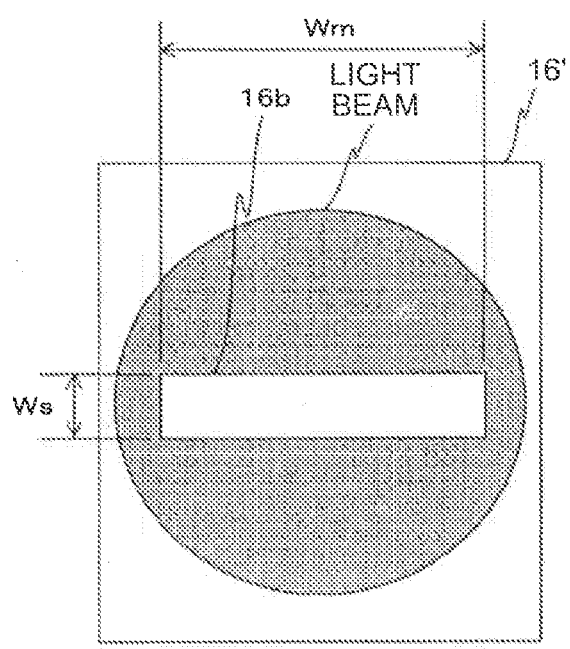
FIG. 11 is a table depicting diameters of light beams (beam diameters) in a main scanning direction and the sub-scanning direction depending on an image height on a photosensitive drum shown in FIG. 1.
FIG. 12 is an enlarged front view of a conventional aperture plate.

FIG. 11 is a table depicting the diameters of the light beams (beam diameters) in the direction Dir_main and the direction Dir_sub depending on the image height on the photosensitive drum 901. As shown in FIG. 11, the beam diameter in the direction Dir_sub is smaller than the beam diameter in the direction Dir_main. The beam diameter is $1/e^2$ of the maximum value of the optical intensity.

FIG. 12 is a diagram of a conventional aperture plate 16' that includes a conventional aperture 16b having a width (Wm) of 5.6 millimeters in the direction Dir_main and a width (Ws) of 0.8 millimeters in the direction Dir_sub. FIG. 13 is a table depicting the beam diameters in the direction Dir_main and the direction Dir_sub depending on the image height on the photosensitive drum 901 when the conventional aperture plate 16' is used instead of the aperture plate 16. As shown in FIG. 13, the beam diameter in the direction Dir_main is smaller than the beam diameter in the direction Dir_sub.

Thus, it is clear that the beam diameter in the direction Dir_sub is smaller when the aperture plate 16 is used. That leads to improved granularity of an image thereby decreasing its rough feel. Thus, an image with high resolution can be output. Because the value of Ws of the apertured curve 16 is 1.6 times greater than that of the conventional aperture plate 16', the light use efficiency of the scanning unit 900 improves by about 60%.

Meanwhile, if the center of the two-dimensional array 100 is aligned with the center of the aperture plate 16 in the direction perpendicular to the optical axis, the center of the light beams emitted by the light-emitting members 101 forming the outermost layer of the two-dimensional array 100 (i.e., from 1st to 10th, from 31st to 40th, 11th, 21st, 20th, and 30th with reference to FIG. 4) does not match with the center of the aperture plate 16. Consequently, the light use efficiency of the light beams emitted by the outermost light-emitting members 101 is worse than the light beams of the light-emitting members 101 arranged in the midsection of the two-dimensional array 100. That may cause uneven density in the image. To avoid such a problem, the outermost light-emitting members 101 can be configured to emit more amount of light than the remaining light-emitting members 101.

As described above, the scanning unit 900 includes the light source 14 having a plurality of surface-emitting lasers (i.e., light-emitting members 101), the polygon mirror 13, the coupling optical system, and the scanning optical system. The coupling optical system includes the coupling lens 15, the aperture plate 16, the image forming lens 17, and the reflecting mirror 18 that are arranged between the light source 14 and the polygon mirror 13 on the optical path of the light beams emitted by the light source 14. The polygon mirror 13 receives light beams of an image formed by the image forming lens 17 and deflects the light beams to the photosensitive drum 901 via the scanning optical system. The focal length of the image forming lens 17 in the direction Dir_sub is set to be equal to or smaller than the optical path length between the image forming lens 17 and the aperture plate 16. As a result, a stable sub-scanning beam pitch can be obtained.

Moreover, in the coupling optical system and the scanning optical system, the absolute value of the lateral magnification in the direction Dir_main is set to be more than the absolute value of the lateral magnification in the direction Dir_sub. Furthermore, over the surface of the photosensitive drum 901, the beam diameter in the direction Dir_sub is set to be equal to or smaller than the beam diameter in the direction Dir_main but greater than the scanning-line distance. As a result, the loss in the amount of light is much less in the scanning unit 900 than in a conventional scanning unit. As a result, it is possible to perform beam shaping that in turn improves the light use efficiency of the scanning unit 900.

Figure 14A:
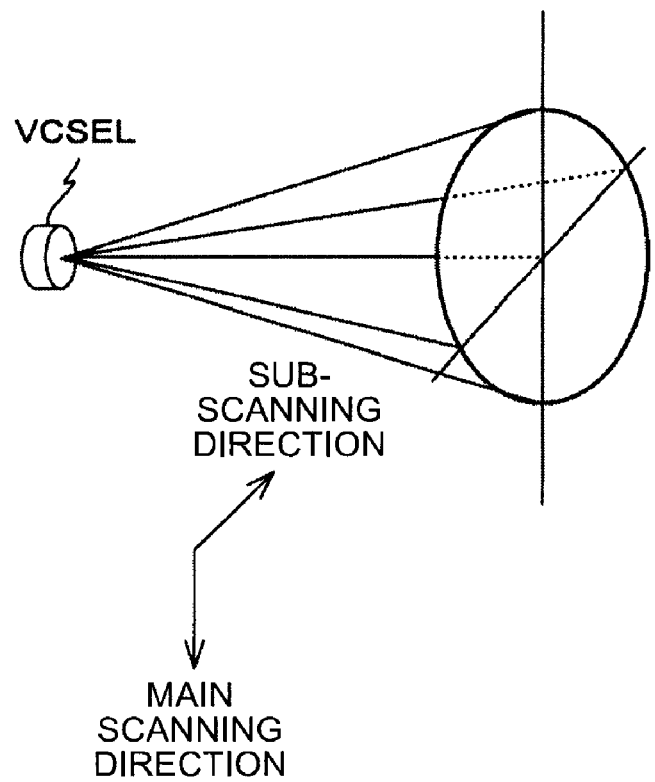
FIGS. 14A and 14B are diagrams for explaining details of a light beam emitted by a VCSEL shown in FIG. 3.
Figure 14B:
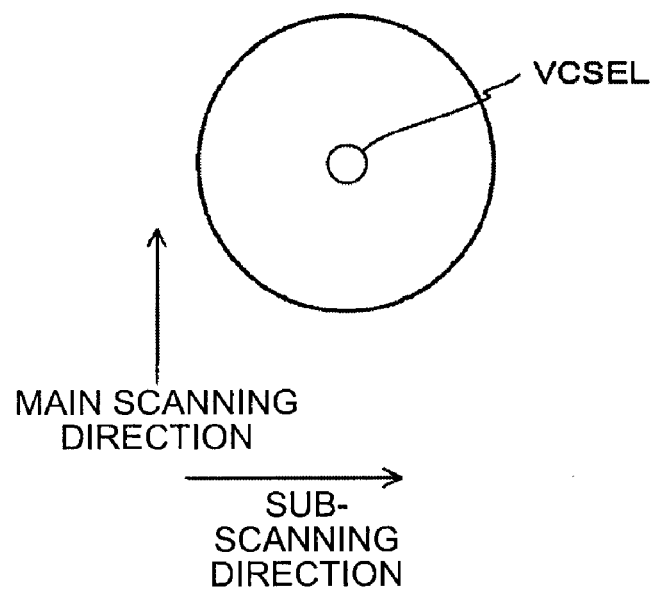
Figure 15:
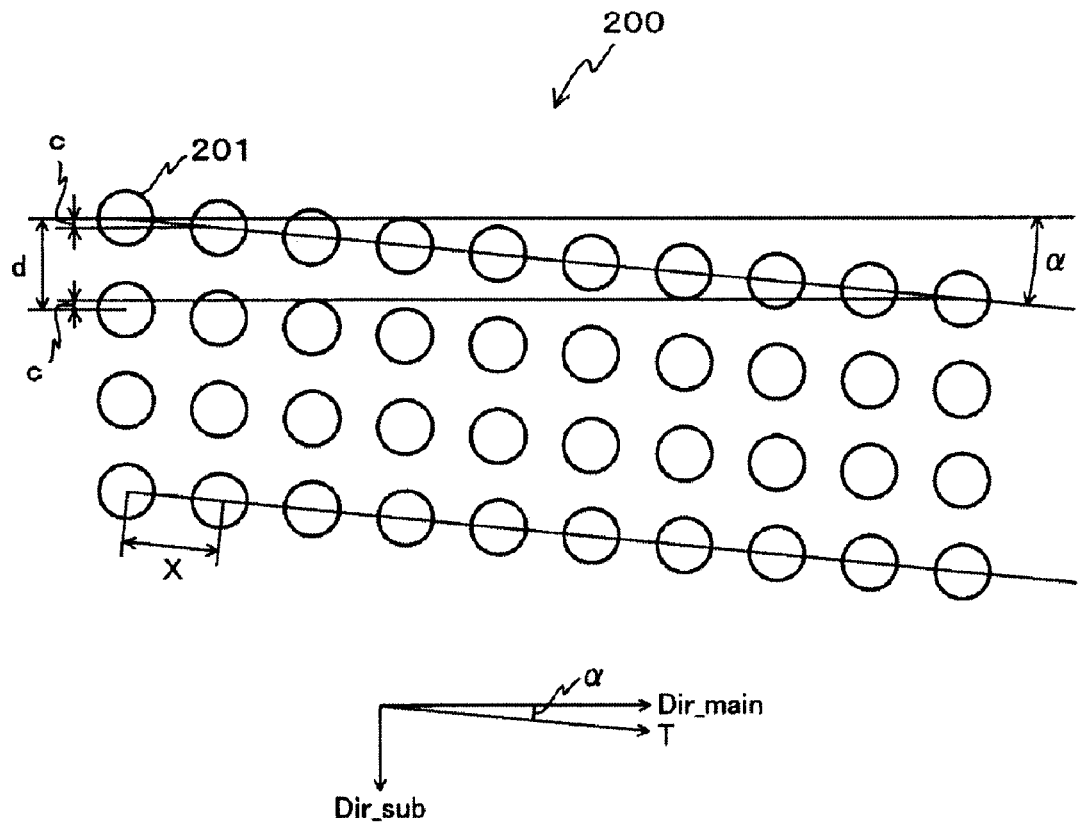
FIG. 15 is a schematic diagram of an alternative two-dimensional array of VCSELs according to the first embodiment.
Figure 16:
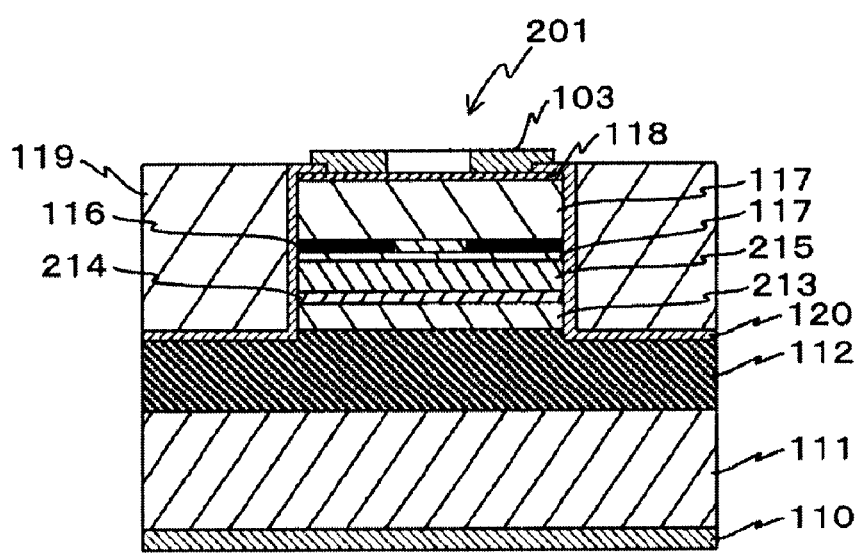
FIG. 16 is a cross-sectional view of a VCSEL in alternative the two-dimensional array shown in FIG. 15.

As shown in FIGS. 14A and 14B, a cross-section perpendicular to the optical axis of the light beam emitted by a VCSEL forms a substantially circular shape. Hence, if the width of an aperture in the direction Dir_main and the width of the aperture in the direction Dir_sub fairly differ from each other, the amount of light falls short of the required amount for handling high-speed imaging.

To solve such a problem, the beam diameter in the direction Dir_main is set to be greater than the beam diameter in the direction Dir_sub over the surface of the photosensitive drum 901. Thus, the difference between the width of the aperture 16a in the direction Dir_main and the width of the aperture 16a in the direction Dir_sub is reduced thereby improving coupling efficiency (i.e., ratio of optical power emitted by a light-emitting member to optical power output from an aperture).

Moreover, the multibeam technology implemented in the light source 14 enables high-resolution and high-speed imaging. In this case, because the scanning-line distance decreases, it is possible to set the beam diameter in the direction Dir_sub to be greater than the scanning-line distance. As a result, no gaps remain in the direction Dir_sub thereby uniformly filling the whole image.

Generally, in an scanning unit implementing the multibeam technology, two methods can be used to improve the image resolution in the direction Dir_sub: (1) to reduce the lateral magnification in the direction Dir_sub; and (2) to reduce the distance between light-emitting members in the Dir_sub. However, in the first method, the amount of light falls short of the required amount because the width of an aperture in the direction Dir_sub needs to be reduced to decrease a beam diameter over a target surface. In the second method, the light beams emitted by the light-emitting members mutually interfere and it is also difficult to secure sufficient space for wiring of each light-emitting member.

As described above, the two-dimensional array 100 in the light source 14 includes four rows of the light-emitting members 101 in the direction Dir_sub, each row including 10 light-emitting members 101 equally spaced along the direction of the tilt angle α, i.e., along the direction T, between the direction Dir_main and the direction Dir_sub. The distance between any two adjacent light-emitting members 101, when orthographically-projected on a virtual line extending in the direction Dir_sub, is equal. In this configuration, the light-emitting members 101 are mutually spread out in the direction Dir_main, which has no effect on the high-resolution of an image in the direction Dir_sub. Thus, even after reducing the distance between the light-emitting members 101 in the Dir_sub, the light beams do not mutually interfere and a sufficient space can be secured for wiring.

Moreover, the focal length of the coupling lens 15 is set to be greater than the optical path length between the coupling lens 15 and the aperture plate 16 thereby reducing the overall optical path length from the light source 14 to the photosensitive drum 901. That is, the aperture plate 16 is arranged between the coupling lens 15 and the back focal position of the coupling lens 15. Such a configuration is different than a conventional configuration in which an aperture plate is arranged at the back focal position of a coupling lens.

As described above, the laser printer 500 includes the scanning unit 900 that can achieve a stable sub-scanning beam pitch. Thus, the laser printer 500 can perform a high-quality and high-speed image forming process.

Instead of the aperture plate 16, an aperture plate having much smaller width in the direction Dir_main can also be used. In that case, the focal length of the coupling lens 15 needs to be readjusted corresponding to the smaller width of the aperture plate.

Moreover, the mesa portion in each light-emitting member 101 need not be of a circular shape and can be of an elliptical shape, a square shape, or a rectangular shape.

As described above, the two-dimensional array 100 includes four rows of the light-emitting members 101 and each row includes 10 light-emitting members 101. However, as long as the number of the light-emitting members 101 in a single row is more than the total number of rows, there is no limitation on the number of the light-emitting members 101 and the number of rows.

As described above, the distance between the light-emitting members 101 orthographically-projected on a virtual line extending in the direction Dir_sub ('c' in FIG. 4) is set to 4.4 micrometers. However, the distance is not limited to 4.4 micrometers and can be changed.

Moreover, as described above, the distance between adjacent rows of the light-emitting members 101 in the direction Dir_sub ('d' in FIG. 4) is set to 44.0 micrometers, while the distance between the light-emitting members 101 in each row of the light-emitting members 101 ('X' in FIG. 4) in the direction T is set to 30.0 micrometers. However, the distances are not limited to those values and can be changed.

Furthermore, instead of the two-dimensional array 100, a two-dimensional array 200 can be used as shown in FIGS. 15 to 18. The two-dimensional array 200 includes a plurality of light-emitting members 201, which are VCSELs. Each light-emitting member 201 includes a plurality of semiconductor layers stacked together. Some of the semiconductor layers are made of a different material than that of the semiconductor layers in the two-dimensional array 100. More particularly, instead of the first spacer layer 113, the active layer 114, and the second spacer layer 115 in the two-dimensional array 100, the two-dimensional array 200 includes a first spacer layer 213, an active layer 214, and a second spacer layer 215, respectively.

The first spacer layer 213 is made of $(Al_{0.7}Ga_{0.3})_{0.5}In_{0.5}P$ that is a wide-band-gap semiconductor material.

Figure 17:
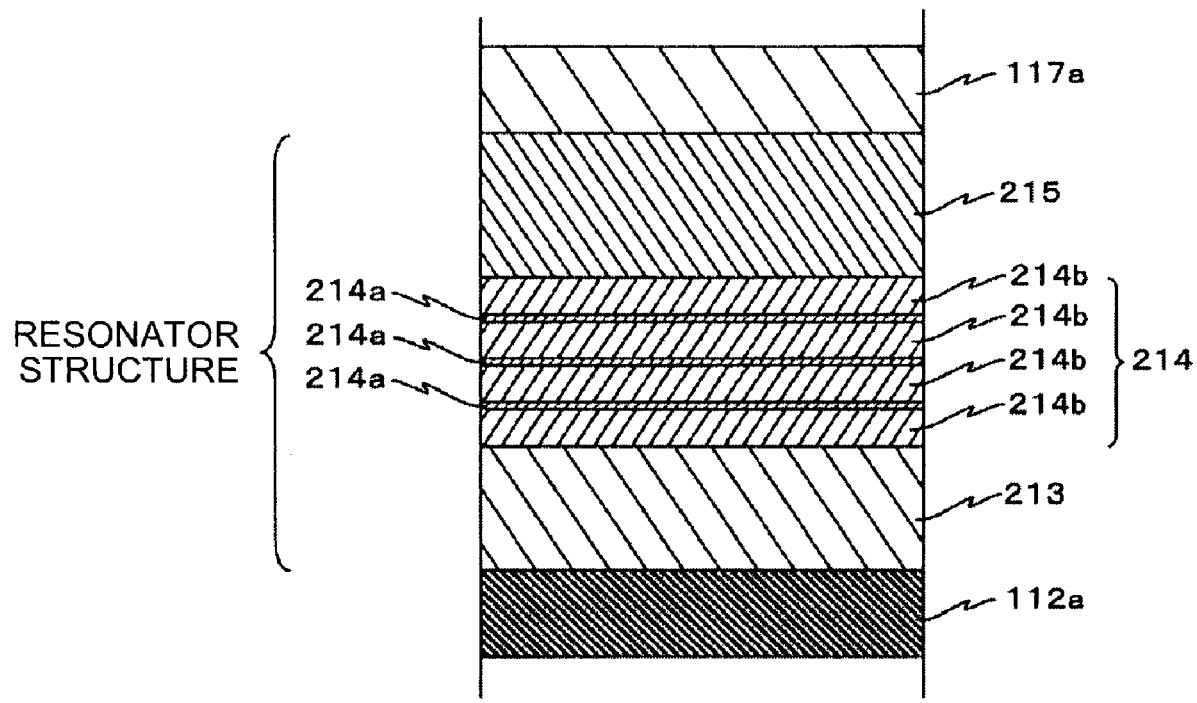
FIG. 17 is an enlarged view of the VCSEL shown in FIG. 16.

As shown in FIG. 17, the active layer 214 includes a quantum well layer 214a made of GaInPAs and a barrier wall layer 214b made of $Ga_{0.6}In_{0.4}P$. The quantum well layer 214a has a three-layered compressively-strained structure having a band gap wavelength of 780 nanometers, while the barrier wall layer 214b has a four-layered tensile-strained structure.

The second spacer layer 215 is made of $(Al_{0.7}Ga_{0.3})_{0.5}In_{0.5}P$ that is a wide-band-gap semiconductor material.

The first spacer layer 213, the active layer 214, and the second spacer layer 215 together are referred as a resonator structure that has an optical thickness equal to one oscillation wavelength (refer to FIG. 17).

Because the layers of the two-dimensional array 200 are made of the AlGaInP material system, it is possible to maintain a much wider band gap between the spacer layers, i.e., the first spacer layer 213 and the second spacer layer 215, and the active layer 214 as compared to the multilayered structure of the two-dimensional array 100.

FIG. 18 is a table depicting different band gaps when VCSELs having multilayered structures of different material composition are used. As shown in FIG. 18, a VCSEL of a 780-nanometer band including a spacer layer and a quantum well layer made of AlGaAs/AlGaAs material system (hereinafter, "VCSEL_A"), a VCSEL of a 780-nanometer band including a spacer layer and a quantum well layer made of AlGaInP/GaInPAs material system (hereinafter, "VCSEL_B"), and a VCSEL of a 850-nanometer band including a spacer layer and a quantum well layer made of AlGaAs/GaAs material system (hereinafter, "VCSEL_C") are used for comparing the band gaps between the respective spacer layers and the active layer, and between the respective barrier wall layer and the quantum well layer. The VCSEL_A corresponds to the light-emitting member 101, while the VCSEL_B having x=0.7 corresponds to the light-emitting member 201.

In case of the VCSEL_B, it is possible to maintain a wider band gap than in case of the VCSEL_A and the VCSEL_C. More particularly, the band gap between the spacer layers and the quantum well layer in the VCSEL_B is 767.3 milli-electron volts, which is greater than the band gap of 465.9 milli-electron volts in the VCSEL_A and the band gap of 602.6 milli-electron volts in the VCSEL_C. Similarly, the band gap between the barrier wall layer and the quantum well layer in the VCSEL_B is 463.3 milli-electron volts, which is greater than the band gap of 228.8 milli-electron volts in the VCSEL_A and the band gap of 365.5 milli-electron volts in the VCSEL_C. Thus, a better carrier confinement can be achieved in case of the VCSEL_B.

Moreover, because the quantum well layer 214a in each light-emitting member 201 has a compressively-strained structure, a higher gain can be obtained due to band separation between a heavy hole and a light hole. As a result, a high optical output can be achieved at a low threshold. Furthermore, the degree of reflection of the upper reflecting mirror 117 (refer to FIG. 16) can also be reduced to further enhance the optical output. Because of a higher gain, the optical output can be prevented from deteriorating due to rise in temperature. Thus, it is possible to arrange mutually close light-emitting members 201 in the two-dimensional array 200.

Because the quantum well layer 214a and the barrier wall layer 214b do not contain aluminum (Al), the active layer 214 is less oxidized thereby curbing the formation of a non-emitting recombination center. As a result, the durability of the light-emitting members 201 can be improved.

If in an optical writing device, a two-dimensional array of VCSELs having poor durability is used, the optical writing device needs to be disposed after one use. However, because the two-dimensional array 200 includes the durable light-emitting members 201, an optical device can be reused for a number of times thereby conserving resources and decreasing environmental burdens. Any other optical device can achieve such advantages by using the two-dimensional array 200.

As described above, the oscillation wavelength of the light emitted by each light-emitting member 101 or 201 is 780 nanometers. However, the oscillation wavelength is not limited to 780 nanometers and can be adjusted depending on the sensitivity characteristics of the photosensitive drum 901. In that case, the material composition or the multilayered structure of the light-emitting members 101 or 201 needs to be changed depending on the oscillation wavelength.

Figure 19A:
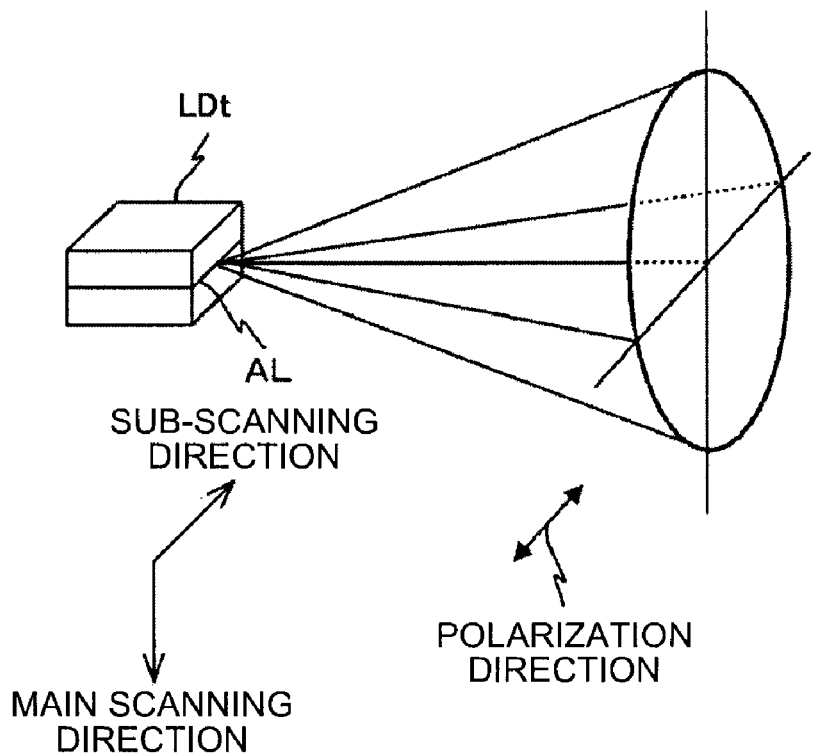
FIGS. 19A and 19B are diagrams for explaining details of a light beam emitted by an edge-emitting laser.
Figure 19B:
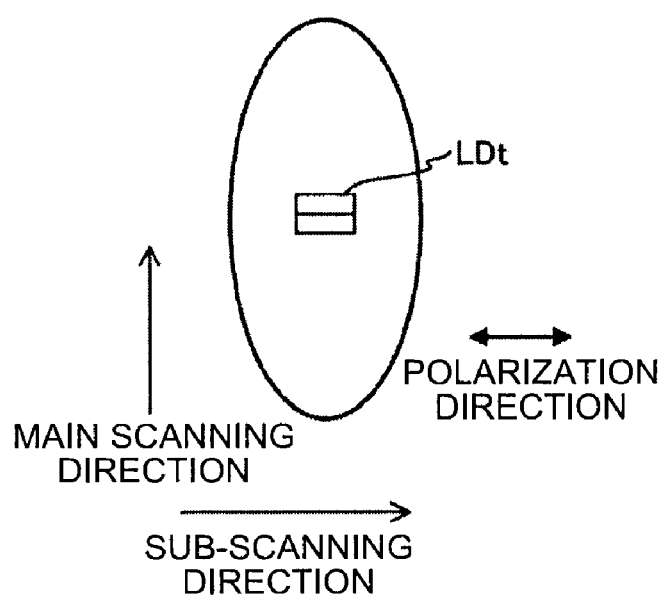

Meanwhile, the amount of optical output from a VCSEL is less than that from an edge-emitting laser. Thus, it is necessary to improve the light use efficiency of the VCSEL. As shown in FIGS. 19A and 19B, the polarization direction of a light beam in an edge-emitting laser is parallel to the direction of an active layer AL. To improve light use efficiency of an scanning unit using the edge-emitting laser, the main scanning direction is set perpendicular to the active layer AL such that the divergence angle is greater. Consequently, the polarization direction becomes same as the sub-scanning direction. On the other hand, a light beam emitted by a VCSEL forms a substantially circular shape. Hence, in case of a scanning unit using a two-dimensional array of VCSELs, the two dimensional array can be arranged such that the angle between the polarization direction and the main scanning direction is greater than the angle between the polarization direction and the sub-scanning direction. Such an arrangement helps in improving transmissivity through a soundproof glass, a scanning lens, and a dust-tight glass without changing the beam diameter. Such an arrangement is especially effective in an optical scanning system using a soundproof glass and a dust-tight glass. Moreover, in case of using a retroreflector, the reflectivity of the retroreflector can also be improved.

FIG. 20 is table depicting light use efficiency of various optical elements at the near side to a light source (topside with reference to FIG. 2) and with respect to a nearest image height. The amount of light use efficiency is given when the polarization direction is same as the main scanning direction and when the polarization direction is same as the sub-scanning direction. As shown in FIG. 20, except for a polygon mirror, the light use efficiency of the optical elements is better when the polarization direction is same as the main scanning direction.

In the above description, the image forming apparatus was considered to be the laser printer 500. However, any other image forming apparatus including the scanning unit 900 can perform a high-quality and high-speed image forming process.

In case of a color-image forming apparatus, an scanning unit compatible to the color-image forming apparatus can be used to achieve a high-quality and high-speed image forming.

Moreover, as shown in FIG. 21, the image forming apparatus can also be a tandem-type color-image forming apparatus that includes a plurality of photosensitive drums, each photosensitive drum forming a toner image corresponding to a single color, and a set of components corresponding to each photosensitive drum. More particularly, the tandem-type color-image forming apparatus shown in FIG. 21 includes a photosensitive drum K1 for forming black toner images, a photosensitive drum C1 for forming cyan toner images, a photosensitive drum M1 for forming magenta toner images, and a photosensitive drum Y1 for forming yellow toner images. The set of components corresponding to the photosensitive drum K1 includes a charger K2, a developer K4, a cleaning unit K5, and a charging unit for transfer K6. Similarly, the set of components corresponding to the photosensitive drum C1 includes a charger C2, a developer C4, a cleaning unit C5, and a charging unit for transfer C6. The set of components corresponding to the photosensitive drum M1 includes a charger M2, a developer M4, a cleaning unit M5, and a charging unit for transfer M6. The set of components corresponding to the photosensitive drum Y1 includes a charger Y2, a developer Y4, a cleaning unit Y5, and a charging unit for transfer Y6. Apart from that, the tandem-type color-image forming apparatus includes the scanning unit 900, a transfer belt 80, and a fixing unit 30.

In this case, the light-emitting members 101 in the light source 14 are classified into four groups, each group emitting light to one of the photosensitive drums K1, C1, M1, and Y1. Alternatively, four units of the two-dimensional array 100 (or the two-dimensional array 200) can be arranged corresponding to each of the photosensitive drums K1, C1, M1, and Y1. Moreover, four units of the scanning unit 900 can also be arranged corresponding to each of the photosensitive drums K1, C1, M1, and Y1.

As shown in FIG. 21, each of the photosensitive drums K1, C1, M1, and Y1 rotates in the clockwise direction. The charger (K2, C2, M2, and Y2), the developer (K4, C4, M4, and Y4), the cleaning unit (K5, C5, M5, and Y5), and the charging unit for transfer (K6, C6, M6, and Y6) are sequentially arranged along the rotational direction of the corresponding photosensitive drum (K1, C1, M1, and Y1). The charger (K2, C2, M2, and Y2) uniformly charges the surface of the corresponding photosensitive drum (K1, C1, M1, and Y1). The charged surface of the photosensitive drum (K1, C1, M1, and Y1) is exposed to light emitted from the scanning unit 900 such that a latent image is formed on the surface of the photosensitive drum (K1, C1, M1, and Y1). The developer (K4, C4, M4, and Y4) develops the corresponding latent image to form a toner image in the corresponding color (black, cyan, magenta, and yellow). The charging unit for transfer (K6, C6, M6, and Y6) transfers the corresponding single-color toner image onto a recording paper such that all four toner images are superimposed to form a full-color toner image. Finally, the fixing unit 30 fixes the full-color toner image on the recording paper.

Sometimes, color drift occurs in the images formed by a tandem-type color-image forming apparatus. However, by using the scanning unit 900 that includes the two-dimensional array 100 of the high-density light-emitting members 101 (VCSELs), it is possible to selectively switch ON the light-emitting members 101 to precisely correct the color drift.

Meanwhile, an image forming apparatus that includes a silver halide film as an image carrier can also be used. In that case, a latent image is formed on the silver halide film by optical scanning. The latent image can be developed by a usual developing process performed in silver halide photography. Such an image forming apparatus can be implemented as an optical plate-making apparatus or an optical lithography device to plot a computed tomography (CT) scan image.

Moreover, an image forming apparatus including a color-developing medium (e.g., a positive photographic paper), which develops colors due to heat energy of a beam spot, as an image carrier can also be used. In that case, the image can be developed directly on the image carrier by optical scanning.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A scanning unit that scans a scanning target surface by using light fluxes, the scanning unit comprising:
    a light source having a plurality of surface-emitting lasers each emitting a light beam;
    a coupling lens that receives the light beams from the light source and renders the light beams as substantially parallel light;
    an aperture that receives the parallel light and defines a diameter of the parallel light thereby obtaining a diameter-defined parallel light;
    an image forming lens that receives the diameter-defined parallel light and forms an image in a sub-scanning direction; and
    an optical deflector that is arranged close to a focal point of the image forming lens, and that receives light beams of the image and deflects the light beams for scanning a target surface, wherein
    a focal length of the image forming lens in the sub-scanning direction is smaller than an optical path length between the image forming lens and the aperture, and
    a beam diameter in the sub-scanning direction is equal to or smaller than a beam diameter in the main scanning direction but greater than a distance between adjacent scanning lines.

2. The scanning unit according to claim 1, wherein a focal length of the coupling lens is greater than an optical path length between the coupling lens and the aperture.

3. The scanning unit according to claim 1, wherein an absolute value of lateral magnification in a main scanning direction is more than an absolute value of lateral magnification in the sub-scanning direction.

4. The scanning unit according to claim 1, wherein
    each of the surface-emitting lasers emits a linearly-polarized light beam,
    an absolute value of lateral magnification in the main scanning direction is more than an absolute value of lateral magnification in the sub-scanning direction, and
    an angle between a polarization direction of the linearly-polarized light beam and the main scanning direction is greater than an angle between the polarization direction and the sub-scanning direction.

5. The scanning unit according to claim 1, wherein
    the surface-emitting lasers are arranged in a two-dimensional array such that M number of the surface-emitting lasers ($M \geq 2$) are arranged along the sub-scanning direction and N number of the surface-emitting lasers ($N>M$) are arranged along a direction of a tilt angle $\alpha$ between the main scanning direction and the sub-scanning direction, and
    a distance between adjacent light-emitting members, when orthographically-projected on a virtual line extending in the sub-scanning direction, is equal.

6. The scanning unit according to claim 5, wherein at least one of outermost light-emitting members in the two-dimensional array emits a greater amount of light than remaining light-emitting members.

7. The scanning unit according to claim 1, wherein the plurality of surface-emitting lasers include a quantum well layer having a compressively strained structure such that a high optical output can be achieved at a low threshold.

8. An image forming apparatus comprising:
    at least one unit of an image carrier; and
    at least one scanning unit including:
        a light source having a plurality of surface-emitting lasers each emitting a light beam;
        a coupling lens that receives the light beams from the light source and renders the light beams as substantially parallel light;
        an aperture that receives the parallel light and defines a diameter of the parallel light thereby obtaining a diameter-defined parallel light;
        an image forming lens that receives the diameter-defined parallel light and forms an image in a sub-scanning direction; and
        an optical deflector that is arranged close to a focal point of the image forming lens, and that receives light beams of the image and deflects the light beams for scanning a target surface,
        wherein a focal length of the image forming lens in the sub-scanning direction is smaller than an optical path length between the image forming lens and the aperture, and
        wherein the scanning unit scans the image carrier with a plurality of light beams having image information, and
        a beam diameter in the sub-scanning direction is equal to or smaller than a beam diameter in the main scanning direction but greater than a distance between adjacent scanning lines.

9. The image forming apparatus according to claim 8, wherein the image information is color-image information for forming a color image.

* * * * *